US008731293B2

(12) United States Patent
Fam et al.

(10) Patent No.: US 8,731,293 B2
(45) Date of Patent: May 20, 2014

(54) REPRESENTING SIGNALS FOR CLASSIFICATION

(75) Inventors: Adly T. Fam, East Amherst, NY (US); Aaron J. Roof, Lima, NY (US)

(73) Assignee: The Research Foundation for State University of New York, Amherst, NY (US)

( * ) Notice: Subject to any disclaimer, the term of this patent is extended or adjusted under 35 U.S.C. 154(b) by 90 days.

(21) Appl. No.: 13/441,600

(22) Filed: Apr. 6, 2012

(65) Prior Publication Data

US 2012/0257829 A1    Oct. 11, 2012

Related U.S. Application Data

(60) Provisional application No. 61/472,226, filed on Apr. 6, 2011.

(51) Int. Cl.
*G06K 9/34* (2006.01)

(52) U.S. Cl.
USPC ............................ 382/171; 375/316; 375/322

(58) Field of Classification Search
None
See application file for complete search history.

(56) References Cited

U.S. PATENT DOCUMENTS

| 4,166,980 | A * | 9/1979 | Apostolos et al. | 375/316 |
|---|---|---|---|---|
| 2006/0072679 | A1 * | 4/2006 | Chen et al. | 375/261 |
| 2009/0290793 | A1 * | 11/2009 | Engholm et al. | 382/171 |
| 2010/0283666 | A1 * | 11/2010 | Lee et al. | 342/175 |
| 2010/0316168 | A1 * | 12/2010 | Ha et al. | 375/322 |

OTHER PUBLICATIONS

Wikipedia. "Short-time Fourier transform." Version as of Mar. 23, 2010.*
Wikipedia. "Inflection point." Version as of Mar. 6, 2010.*
Prakasam, P. and Madheswaran, M. "Automatic Modulation Identification of QPSK and GMSK using Wavelet Transform for Adaptive Demodulator in SDR," Feb. 2007 IEEE, p. 507-511.*
Bottou et al. "*Comparison of Classifier Methods: A Case Study in Handwritten Digit Recognition*" Pattern Recognition, 1994. vol. 2—Proceedings of the 12th IAPR International. Conference on Pattern Recognition, Conference B: Computer Vision & Image Processing., vol. 2, pp. 77-82; 1994.
Dobre et al. "*A Survey of Automatic Modulation Classification Techniques: Classical Approaches and New Trends*" IET Communications, vol. 1, Issue 2, pp. 137-156, Apr. 2007.
Nandi et al. "*Algorithms for Automatic Modulation Recognition of Communication Signals*" IEEE Transactions on Communications, vol. 46, No. 4, pp. 431-436, Apr. 1998.
Safavian et al. "*A Survey of Decision Tree Classifier Methodology*" IEEE Transactions on Systems, Man, and Cybernetics, vol. 21, No. 3, pp. 660-674, May/Jun. 1991.

(Continued)

*Primary Examiner* — Vu Le
*Assistant Examiner* — Samah Beg
(74) *Attorney, Agent, or Firm* — Fish & Richardson P.C.

(57) ABSTRACT

The subject matter described in this specification can be embodied in a method that includes partitioning a received signal into a sequence of two or more segments. For a given segment in the sequence, the method includes calculating a set of frequency domain coefficients corresponding to the given segment, and identifying local peaks in the set of frequency domain coefficients by applying a threshold. The method also includes providing a multi-dimensional histogram from a plurality of peaks identified from multiple segments, wherein the multi-dimensional histogram jointly represents frequencies and coefficient values corresponding to each of the plurality of identified peaks.

20 Claims, 10 Drawing Sheets

(56) References Cited

OTHER PUBLICATIONS

Shklyaeva et al. "*Classification of Digital Modulations Mainly Used in Mobile Radio Networks by means of Spectrogram Analysis*" IFIP International Federation for Information Processing, vol. 245, Personal Wireless Communications, eds. Simak, B., Bestak, R., Kozowska, E., (Boston: Springer), pp. 341-348, 2007.

Tan et al. "*Automatic Modulation Recognition of Mixed Multiple Source Signals*" Frequenz, vol. 65 (2011), pp. 37-45, 2011.

Trier et al. "*Feature Extraction Methods for Character Recognition—A Survey*" Pattern Recognition, vol. 29, No. 4, pp. 641-662, 1996.

Wang et al. "*Analysis and Design of a Decision Tree Based on Entropy Reduction and Its Application to Large Character Set Recognition*" IEEE Transactions on Pattern Analysis and Machine Intelligence, vol. PAMI-6, No. 4, pp. 406-417, Jul. 1984.

\* cited by examiner

REPRESENTING SIGNALS FOR CLASSIFICATION

CROSS REFERENCE TO RELATED APPLICATION

This application claims the benefit of U.S. Provisional Application No. 61/472,226, filed Apr. 6, 2011, the entire content of which is hereby incorporated by reference.

TECHNICAL FIELD

This description relates to signal representation.

BACKGROUND

A received signal can include different types of component signals. The modulations of the component signals can be different from one another.

SUMMARY

In one aspect, the subject matter described in this specification can be embodied in a method that includes partitioning a received signal into a sequence of two or more segments. For a given segment in the sequence, the method includes calculating a set of frequency domain coefficients corresponding to the given segment, and identifying local peaks in the set of frequency domain coefficients by applying a threshold. The method also includes providing a multi-dimensional histogram from a plurality of peaks identified from multiple segments, wherein the multi-dimensional histogram jointly represents frequencies and coefficient values corresponding to each of the plurality of identified peaks.

In another aspect, a system includes a computing device. The computing device includes a processor and memory and can be configured to partition a received signal into a sequence of two or more segments. For a given segment in the sequence, the computing device is configured to calculate a set of frequency domain coefficients corresponding to the given segment, and identify local peaks in the set of frequency domain coefficients by applying a threshold. The computing device is further configured to provide a multi-dimensional histogram from a plurality of peaks identified from multiple segments, wherein the multi-dimensional histogram jointly represents frequencies and coefficient values corresponding to each of the plurality of identified peaks.

In another aspect, a computer program product includes computer readable instructions tangibly embodied in a storage device. The instructions are configured to cause one or more processors to partition a received signal into a sequence of two or more segments. For a given segment in the sequence, the instructions cause a processor to calculate a set of frequency domain coefficients corresponding to the given segment, and identify local peaks in the set of frequency domain coefficients by applying a threshold. The instructions are further configured to cause a processor to provide a multi-dimensional histogram from a plurality of peaks identified from multiple segments, wherein the multi-dimensional histogram jointly represents frequencies and coefficient values corresponding to each of the plurality of identified peaks.

Implementations can include one or more of the following. The multi-dimensional histogram can be represented as an image. A modulation characteristic of a signal can be identified from the multi-dimensional histogram. The modulation characteristic can include a modulation type. The modulation type can be selected from a group consisting of: amplitude shift keying (ASK), phase shift keying (PSK), frequency shift keying (FSK), frequency modulation (FM), quadrature amplitude modulation (QAM), offset quadrature phase shift keying (OQPSK), and orthogonal frequency divisional multiplexing (OFDM). The identifying can be performed using an automatic classifier. Identifying the local peaks can include identifying one or more coefficients that exceed the threshold and selecting a coefficient that corresponds to an inflection point. Calculating the frequency domain coefficients can include obtaining a windowed segment as a product of the given segment and a window function, and calculating the frequency domain coefficients using the windowed segment. Providing the multi-dimensional histogram can further include providing a quantized value based on a coefficient value corresponding to an identified peak. The quantized value can be binned into one of a plurality of magnitude bins defined for a frequency corresponding to the identified peak. A decoding method for a software defined radio (SDR) application can be determined based on the multi-dimensional histogram. Calculating the frequency domain coefficients can include computing a short time discrete Fourier transform.

Among the many advantages of the invention (some of which may be achieved only in some of its various aspects and implementations) are the following.

One or more signals within a given band can be identified using the joint peak frequency magnitude (PFM) histogram described herein without a priori knowledge about the signals. Simple and computationally inexpensive pattern matching algorithms can be used for automatic detection and/or classification of the signals from the joint PFM histogram. This can be useful, for example, in software defined radio (SDR) applications to implement a receiver where a decoding method can be adaptively chosen based on determining a modulation of a received signal. In another example, the PFM histogram described herein can be used to jointly detect and/or classify desired and undesired (e.g., interference) signals that may be present in a received signal. By recognizing the used frequency ranges and modulation types, available frequency ranges can be adaptively used with appropriate modulation types for communication between two or more locations, with low interference with existing communication channels. In another example, the presence of an unexpected signal (e.g., a signal originating from a jammer or another non-friendly source) can also be detected from the PFM histogram. Also, by identifying signals and their modulation type in a certain frequency range, some of the signals can be jammed efficiently with low power, without affecting nearby friendly signals. The PFM histogram can be used both in an automated process (for example, in conjunction with an automated analyzer that analyzes the PFM histogram) as well as in a user assisted method where the PFM histogram is reviewed by a user.

DETAILED DESCRIPTION

Signal classification is used in communication systems, for example, in Software Defined Radio (SDR) applications. For example, the ability to recognize a type of a received signal can allow a receiver system to choose an appropriate decoding method for decoding the received signal. In some cases, the received signal space may be occupied by only one signal, and the frequency range of the signal may be known. However, in some systems, the receiver may be completely blind to the number and characteristics (e.g., modulation types) of signals within the bandwidth of interest. The methods and systems described herein allow a representation of the received signal in a way such that one or more component signals and their characteristics can be jointly identified from the representation. In some implementations, providing the representation includes collapsing of localized magnitude peaks from frequency domain representations (e.g., as computed via short time Discrete Fourier Transforms (DFT)) of consecutive segments of the received time domain signal into magnitude histograms to create a representation of the frequency-magnitude density of the received signal space. In some implementations, this allows for simultaneously including in the representation, one or more signals that may be present in a bandwidth of interest. This can include, for example, signals with relatively lower power than the strong signals. This representation is referred to herein as a joint peak frequency-magnitude histogram (PFM). The PFM histogram can be a useful visualization tool in characterizing the signal space, for example, in a user assisted mode of signal classification. In some implementations, the process can also be automated by utilizing pattern recognition and image processing algorithms to analyze the PFM.

In some implementations, component signals of a composite received signal are identified and/or classified based on the differences in their respective modulations. For example, information bearing signals usually employ carrier modulation. Therefore, characteristics of the signal that can be used in detecting and thus classifying the signal can include carrier frequency and modulation type. In some cases, the number of signals in a given bandwidth may be unknown. Further, if there are multiple signals in the given bandwidth, the frequency of operation for each of the multiple signals as well as the corresponding modulation types may also be unknown. In such cases, the use of a single signal classifier such as a constellation detector is impractical. Described herein are methods and systems that allow for these characteristics to be determined jointly across multiple signals within a bandwidth of interest.

Figure 1:
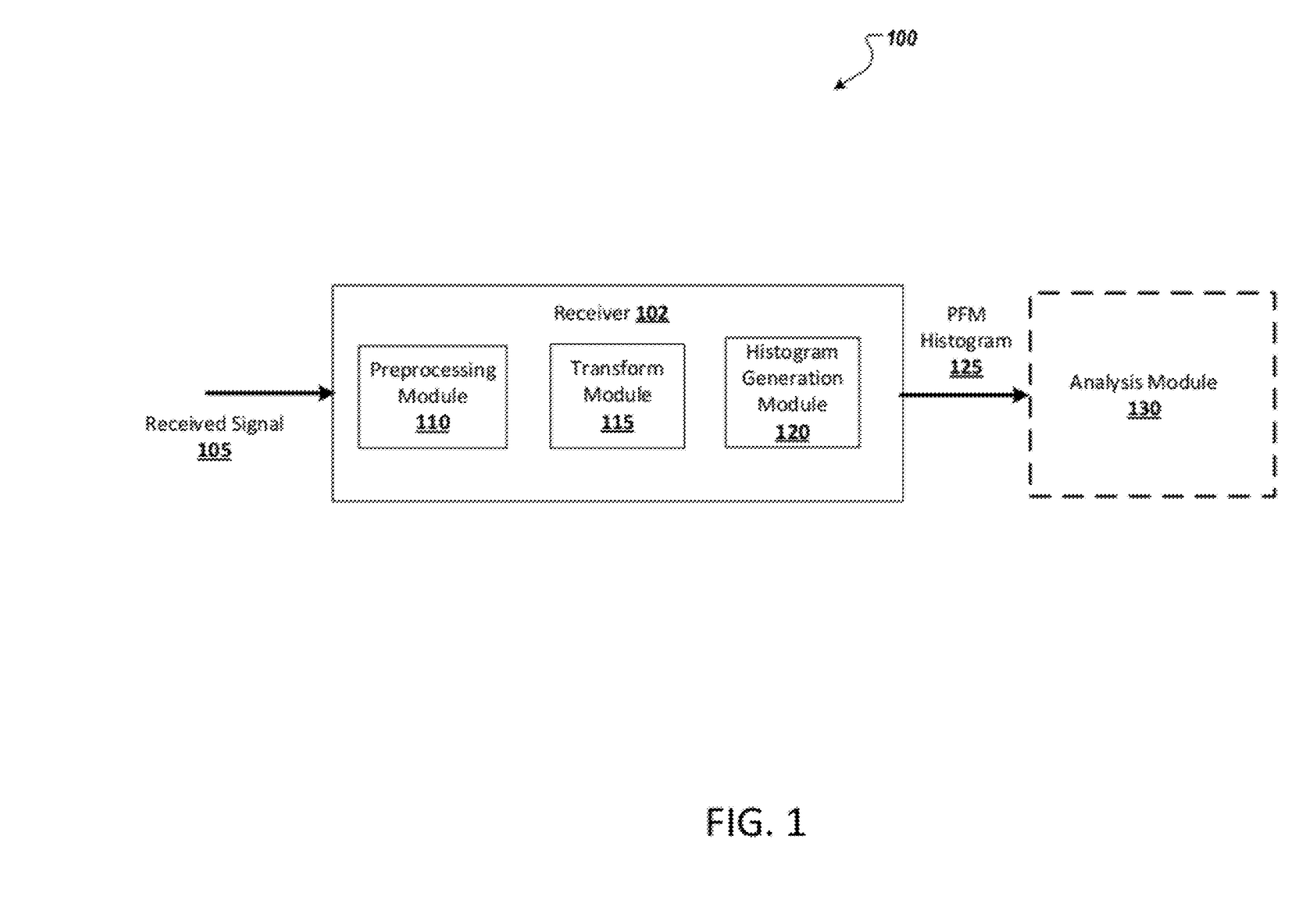
FIG. 1 is a diagram of an example system for receiving and processing a signal.

FIG. 1 is a diagram of an example system 100 for receiving and processing a signal 105. The received signal 105 can be a composite signal that includes one or more component signals that can vary, for example, in frequency, modulation, or other characteristics. The system 100 includes a receiver 102 that receives the signal 105 and generates a PFM histogram 125 from the received signal 105. The PFM histogram 125 can be optionally processed, for example, in an analysis module 130 that facilitates automatic detection, classification, etc. of the component signals based on analyzing the PFM histogram 125.

In some implementations, the receiver 102 includes a preprocessing module 110 that preprocesses the received signal 105 in preparation of providing the PFM histogram 125. In some implementations, the preprocessing module 110 can be configured to perform several preprocessing steps, including, for example, sampling and/or filtering the received signal 105. For example, the received signal 105 can be an analog signal and the preprocessing module 110 can be configured to band limit (e.g., using a low pass filter) and/or sample (for example, using an analog to digital converter (ADC)) the received signal 105 appropriately to avoid or reduce aliasing effects. In some implementations, the sampling amplitude range is large enough to include potential signals for classification. In some implementations, the input range can be normalized. In some implementations, the ratio of the sample rate to block size (samples) can be larger than the bandwidth of the signals being analyzed. In such cases, the analyzed signals are generally narrow-band relative to the sampling rate. In some implementations, the sampling rate can be chosen based on an a priori knowledge of signals expected to be detected.

In some implementations, the preprocessing module 110 can be configured to output a composite signal containing up to M independent signals (where M is an integer) of varying characteristics. The M independent signals may have at least partially non-overlapping spectra. The composite signal (referred to herein as x(n)) can be, for example, a discrete, time invariant stream of samples of bounded amplitude represented as:

$$x(n) = N(n) + \sum_{m=1}^{M} S_m(n) A_m e^{j(2\pi n fc_m + \varphi_m)} \qquad (1)$$

where $S_m(n)$ represents baseband signals (also referred to herein as "sub-signals" or "component signals") of unknown modulation format, amplitude, etc. and N(n) is the post sampled noise that may be included in the composite signal. In some implementations, the noise can be Additive White Gaussian Noise (AWGN). The values $fc_m$, $\varphi_m$ represent the center frequency and phase offsets for each sub-signal.

In some implementations, the preprocessing module 110 can also be configured to partition the received signal 105 into a sequence of segments. For example, the signal x(n) can be partitioned into blocks of length L samples (L being an integer). In some implementations, the partition length L can be chosen based on the transform size used by the transform module 115. For example, if the transform module 115 uses a discrete Fourier transform (DFT) of length K, the preprocessing module can be configured to choose the block length L as less than or equal to the DFT length K.

The number of segments into which a given portion of the received signal 105 is divided into can be represented as I. In some cases the segments can be of substantially equal length (e.g., L) to one another. However, in some implementations, two segments corresponding to a portion of the received signal 105 can also be of unequal length. In the present example, the I segments are of equal length (L samples each) and are indexed by i=(0, 1, ... I−1). Therefore, the signal x(n) can be represented as a sequence of segments given by:

$$x_i(n) = <x(iL+1), x(iL+2) \ldots x(iL+L)> \qquad (2)$$

In some implementations, the preprocessing module can also be configured to window the segments. This can include computing a product of a given segment with a window function w(n). Various functions can be chosen as the window function w(n). For example, the window function can be one of a Hamming window, a Hanning (or Hann) window, a rectangular window, a Tukey window, a Gaussian window, a Kaiser window, a cosine window, a Lanczos window, a Bartlett window, a Blackman window, a Bartlett-Hann window or another function that is zero-valued outside a chosen interval. In this example, a Hanning window is used and the windowed segment produced by the preprocessing module is represented as:

$$s_i(n) = x_i(n) \cdot w(n) \quad (3)$$

The receiver 102 can also include a transform module 115 that can be configured to compute a frequency domain representation of a given segment. In this example, a windowed segment is provided as an input to the transform module 115. However, in some cases a given segment can be provided to the transform module 115 without windowing. In some implementations, the windowing can also be performed by the transform module 115.

In general, the transform module 115 is configured to compute a set of transform domain coefficients that represent a given segment. The transform domain can be, for example, a frequency domain, spatial domain etc. In this document, the frequency domain is used as an example of the transform domain. The transform used in the transform module 115 can include, for example, a discrete Fourier Transform (DFT) or a short time Fourier transform. For example, the transform module 115 can be configured to compute DFT of a windowed segment. If the DFT length K is larger than the block size L, then the block can be zero padded prior to computing the DFT. The magnitude of the DFT operation can be represented as:

$$s_i(\omega) = |DFT\{s_i(n)\}| \quad (4)$$

where $\omega$ represents discrete frequencies. In some implementations, a range of frequencies can be quantized in a bin and represented by a discrete frequency $\omega$.

The receiver 102 further includes a histogram generation module 120 that produces the PFM histogram 125 from a plurality of sets of frequency domain coefficients, wherein each set represents the frequency domain coefficients corresponding to a particular segment.

In some implementations, the frequency domain coefficients corresponding to a given segment are processed by the histogram generation module 120 to extract localized peaks that are above a given threshold. This can include obtaining the values of the localized peaks, and the frequency index of the localized peaks which are higher than the threshold. In some implementations, this can be done, for example, using a sparse impulse train that has a value of 1 at each positive inflection of the corresponding spectrum, and zero elsewhere. Such an impulse train can be represented as:

$$D_i(\omega) = \sum_{j=1}^{J} \delta_k(\omega - \omega_j) \quad (5)$$

where $\omega_j$ is the frequency bin of the localized positive peaks above a certain threshold, $\delta_k$ is a discrete delta function, and J is the total number of inflection points indexed by j. The impulse train can be generated as a function of $s_i(\omega)$, for example, as:

$$D_i(\omega) = \frac{\partial}{\partial \omega}\left\{sign\left[\frac{\partial}{\partial \omega}\left\{\frac{1}{2}S_T(1+sign\{S_T\})\right\}\right]\right\} \quad (6)$$

where $S_T$ is defined as:

$$S_T s_i(\omega) - A_T \quad (7)$$

and $A_T$ is the magnitude of the selected threshold. The threshold can be chosen in various ways. In some implementations, the threshold can be selected based on desired system tradeoffs. In some implementations, for example, in manual classification of signals, the threshold can be made variable such that a user can adjust the threshold adaptively based on, for example, a quality of the resulting visualization.

In some implementations, the histogram generation module 120 is configured to obtain a signal $\Gamma_i(\omega)$ that includes the isolated localized peaks. This can be done, for example, as:

$$y_i(\omega) = s_i(\omega) \cdot D_i(\omega) \quad (8)$$

The histogram generation module 120 can further be configured to produce the joint PFM histogram from the signals that includes the localized isolated peaks identified from the frequency domain coefficients corresponding to the different segments. In some implementations, this includes creating a two dimensional histogram of the magnitudes of each localized peak for each frequency bin. This can include, for example, creating a magnitude histogram for each of the frequency bins corresponding to identified peaks from the different sets of frequency domain coefficients and merging the histograms corresponding to the different frequency bins as a joint two dimensional histogram.

In some implementations, in order to produce the joint PFM histogram over magnitude and frequency, the magnitude results of the frequency signal $y(\omega)$ are quantized. This can include defining magnitude bins for each frequency that corresponds to an identified peak. In some implementations, the magnitude bins can be defined for each frequency bin regardless of whether the frequency bin (or discrete frequency) corresponds to an identified peak or not. The selection of the magnitude bin size can depend, for example, on the system characteristics including scaling of the magnitude (e.g., decibel (dB) vs. linear), and a desired resolution. In the present examples, dB scaling of the magnitude squared is used (power in dB). In some implementations, the selection of the magnitude bin size can be dynamic. For example, the magnitude bin size can be selected as:

$$\Delta q = \frac{\max\{y\} - \min[y]}{R} \quad (9)$$

where R is the desired number of magnitude bins (resolution) indexed by r. Therefore, the magnitude can be quantized into R bins, each of which is given by:

$$q_r = \min\{y\} + r\Delta q \quad (10)$$

where:

$$r = 0, 1, 2, \ldots, (R-1) \quad (11)$$

and the result $u_r$ takes a value of 1 if the y value being quantized falls into the magnitude range:

$$u_r = \begin{cases} 1 & q_r \le y < q_{r+1} \\ 0 & \text{otherwise} \end{cases} \quad (12)$$

In some implementations, the PFM histogram can be provided as a matrix that represents the occurrences of events that fall into the joint frequency-magnitude bins as follows:

$$U_{k,r} = \sum_{i=0}^{l-1} u_{k,r} \quad (13)$$

where magnitude bin index $r = 0, 1, 2, \ldots, (R-1)$ and frequency bin index $k = 0, 1, 2, \ldots, (K-1)$ In some implementations, the PFM histogram 125 can be used in a user assisted application without an automated analysis of the PFM histogram 125. One example of such an application is a signal analyzer used for detecting interfering signals in a licensed band. In such an application, a technician may view a representation of the PFM histogram 125 on a device that is capable of generating and/or rendering the PFM histogram 125. In some implementations, the PFM histogram 125 can allow the user to better isolate various signals in a given band so that interfering signals can be identified. The identified signals can then be processed as needed. For example, some of the identified signals can be classified as undesirables, and/or eliminated or suppressed. Another example of a user assisted application is using the PFM histogram 125 in troubleshooting of communication circuits and systems.

In some implementations, the PFM histogram 125 can be provided to an optional analysis module 130 shown in FIG. 1 using dotted lines. The analysis module 130 can be configured to automatically analyze the PFM histogram to identify and/or classify one or more component signals included in the received signal. An example of an application where an automatic analysis of the PFM histogram 125 might be needed is an adaptive receiver for a software defined radio (SDR) in an unlicensed band, where many different signal types are permitted to coexist. In this example, the receiver 102 may need to know one or more characteristics of the received signal to properly decode the signal.

Figure 2:
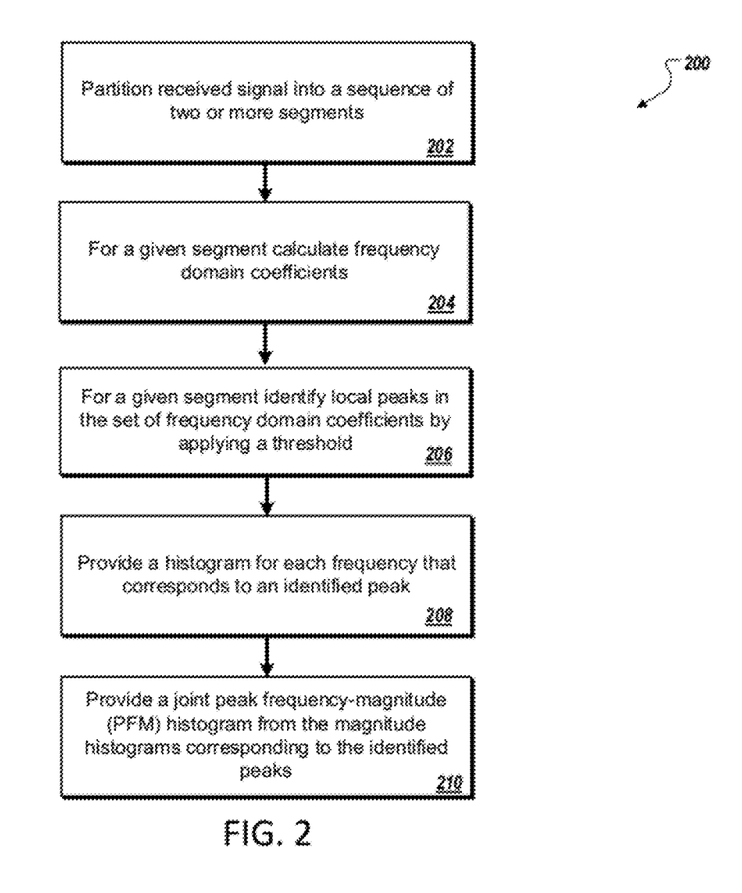
FIG. 2 is a flow diagram of a process for generating a joint PFM histogram.

FIG. 2 is a flow diagram of an example process 200 for generating a joint PFM histogram. In some implementations, one or more of the operations of the process 200 can be performed in a module of the receiver 102 described above with reference to FIG. 1. The operations of the process 200 are described with reference to an example depicted in FIG. 3.

Figure 3:
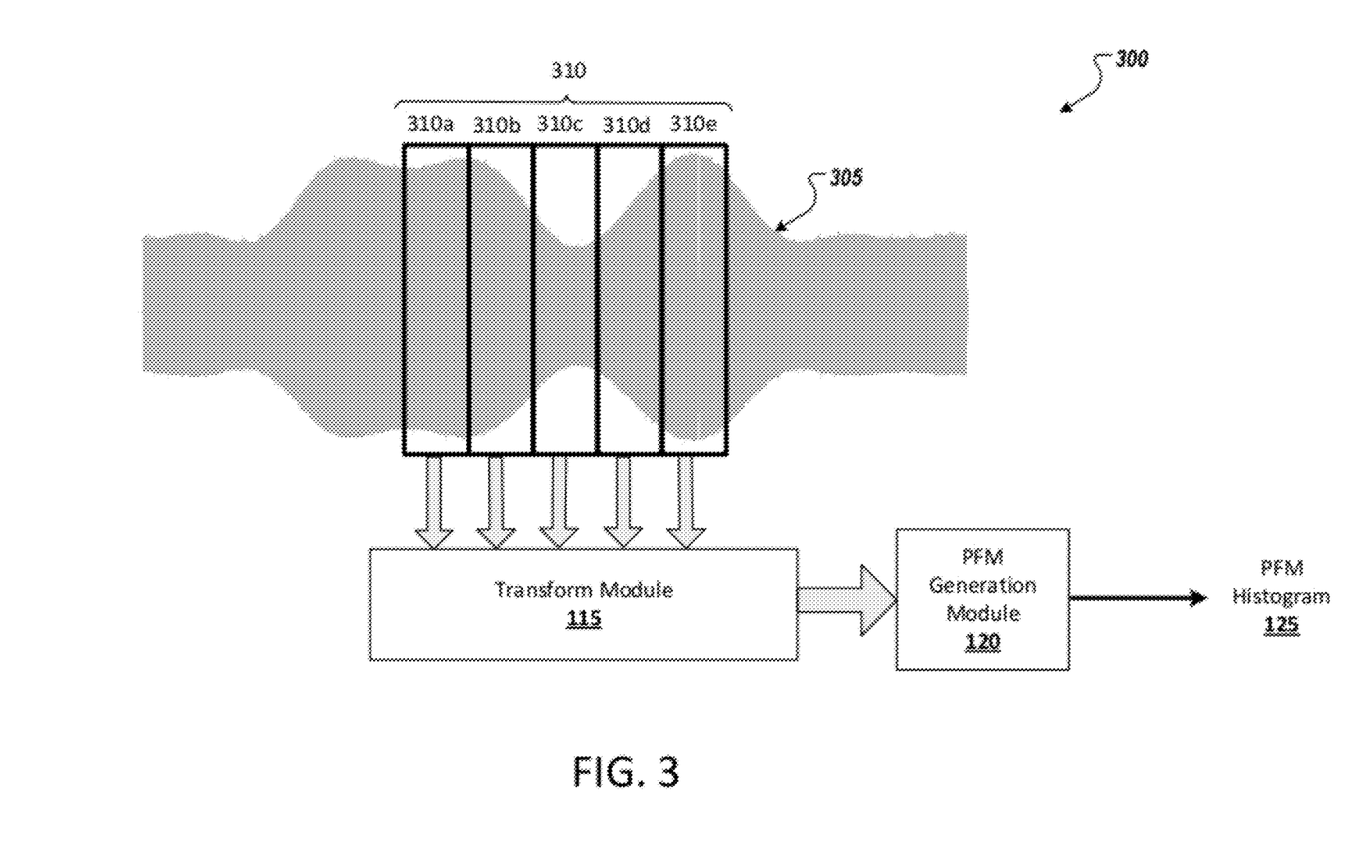
FIG. 3 is a conceptual diagram illustrating the PFM generation process.

Operations can include partitioning a received signal into a sequence of two or more segments (202). The operation 202 is illustrated in FIG. 3 using an example of a band-limited amplitude shift keying (ASK) signal 305. The signal 305 is partitioned into a sequence of segments 310a, 310b, ..., 310e (310, in general). Even though the example of FIG. 3 illustrates non-overlapping segments 310, in some cases the segments 310 can be at least partially overlapping with one another. Each segment 310 can be substantially similar to the segments described above with reference to the preprocessing module 110 in FIG. 1.

Operations can also include, for a given segment, calculating a set of frequency domain coefficients corresponding to the given segment (204). The frequency domain coefficients can be calculated, for example, in the transform module 115 as illustrated in FIG. 3. In some implementations, the frequency domain coefficients are calculated using a discrete Fourier transform.

Operations also include identifying, for a set of frequency domain coefficients corresponding to a given sequence, local peaks in the set by applying a threshold (206). In some implementations, this can include identifying one or more coefficients that exceed the threshold and selecting the coefficients that correspond to an inflection point. In some implementations, identifying the local peaks can be performed in the histogram generation module 120. In some implementations, calculating the frequency domain coefficients can also include obtaining a windowed segment as a product of the given segment and a window function; and calculating the frequency domain coefficients using the windowed segment. In some implementations, calculating the frequency domain coefficients and identifying the local peaks can be substantially similar to as described with reference to FIG. 1.

Operations further include providing a magnitude histogram for each frequency that corresponds to an identified peak (208). This can be performed by the histogram generation module 120, for example, by computing the magnitude histogram for a given frequency from sets of frequency domain representations corresponding to a plurality of segments 310. For example, the magnitude histogram can represent frequency domain coefficients at substantially the same frequency from the plurality of segments of the sequence. In some implementations, providing the magnitude histogram can further include quantizing a magnitude of a coefficient corresponding to an identified peak, and binning the quantized magnitude into one of a plurality of magnitude bins defined for the frequency corresponding to the identified peak. The magnitude bins can be defined substantially similarly to as described with reference to FIG. 1.

Operations also include providing a joint PFM histogram from the magnitude histograms corresponding to the identified peaks (210). This can include arranging the magnitude histograms corresponding to the identified peaks in order of frequencies to provide a representation of the PFM histogram 125. If a particular frequency does not correspond to an identified peak, an all zero magnitude histogram can be used for the particular frequency.

Computing Devices

Figure 4:
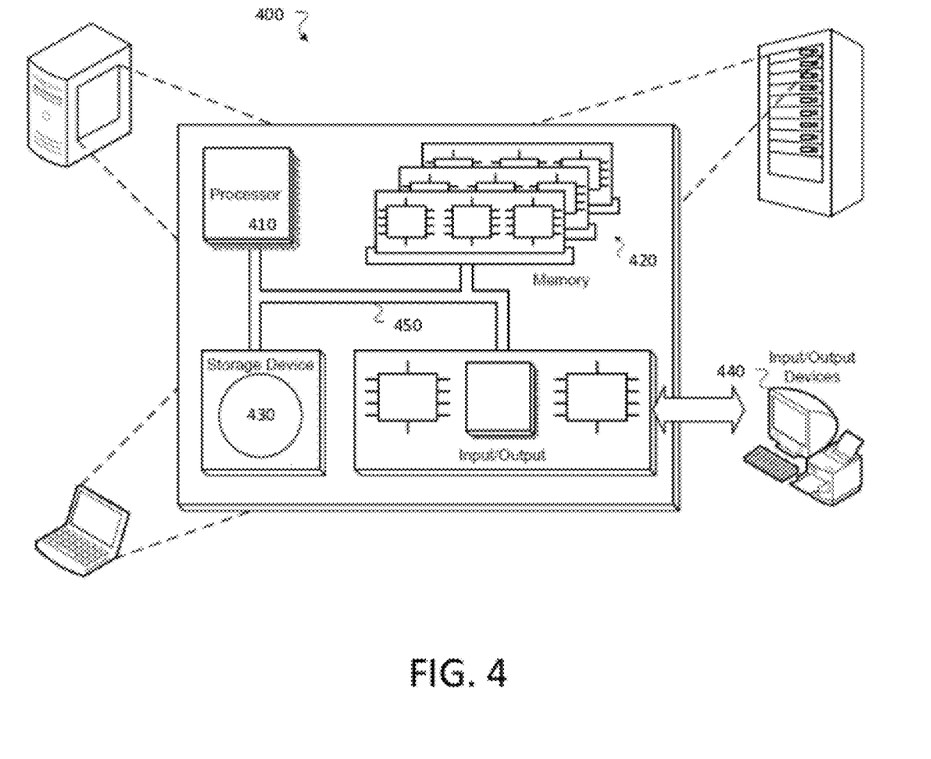
FIG. 4 is a block diagram of a computing device.

FIG. 4 is a schematic diagram of a computer system 400 that can be used to implement one or more of the modules described herein. For example, one or more of the preprocessing module 110, transform module 115, histogram generation module 120 and the analysis module 130 can be implemented using a computing device substantially similar, at least in part, to the system 400. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one embodiment, the processor 410 is a single-threaded processor. In another embodiment, the processor 410 is a multi-threaded processor. The processor 410 is capable of processing instructions stored in the memory 420 or on the storage device 430 to display graphical information for a user interface on the input/output device 440.

The memory 420 stores information within the system 400. In some embodiments, the memory 420 is a computer-readable storage medium. The memory 420 can include volatile memory and/or non-volatile memory.

The storage device 430 is capable of providing mass storage for the system 400. In general, the storage device 430 can include any non-transitory tangible media configured to store computer readable instructions. In one embodiment, the storage device 430 is a computer-readable medium. In various different embodiments, the storage device 430 may be a floppy disk device, a hard disk device, an optical disk device, or a tape device.

The input/output device 440 provides input/output operations for the system 400. In some embodiments, the input/output device 440 includes a keyboard and/or pointing device. In some embodiments, the input/output device 440 includes a display unit for displaying graphical user interfaces.

The features described in this application can be implemented in digital electronic circuitry, or in computer hardware, firmware, or in combinations of them. The features can be implemented in a computer program product tangibly embodied on a non-transitory computer-readable medium, e.g., in a machine-readable storage device, for execution by a programmable processor; and features can be performed by a programmable processor executing a program of instructions to perform functions of the described embodiments by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Alternatively, the computer can have no keyboard, mouse, or monitor attached and can be controlled remotely by another computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

The processor 410 carries out instructions related to a computer program. The processor 410 can include hardware such as logic gates, adders, multipliers and counters. The processor 410 can further include a separate arithmetic logic unit (ALU) that performs arithmetic and logical operations.

Automated Analysis of PFM Histograms

In some implementations, the PFM histogram 125 can be represented as an image that compresses the samples taken from consecutive DFTs into a two dimensional histogram of localized maxima above a predetermined threshold. As such, the PFM histogram 125 can provide an estimate of the distribution of relative maxima of the spectrum of the incoming signal. In some implementations, the analysis module 130 can be configured to use a Decision Tree Classifier (DTC) in analyzing the PFM histogram 125.

Figure 5:
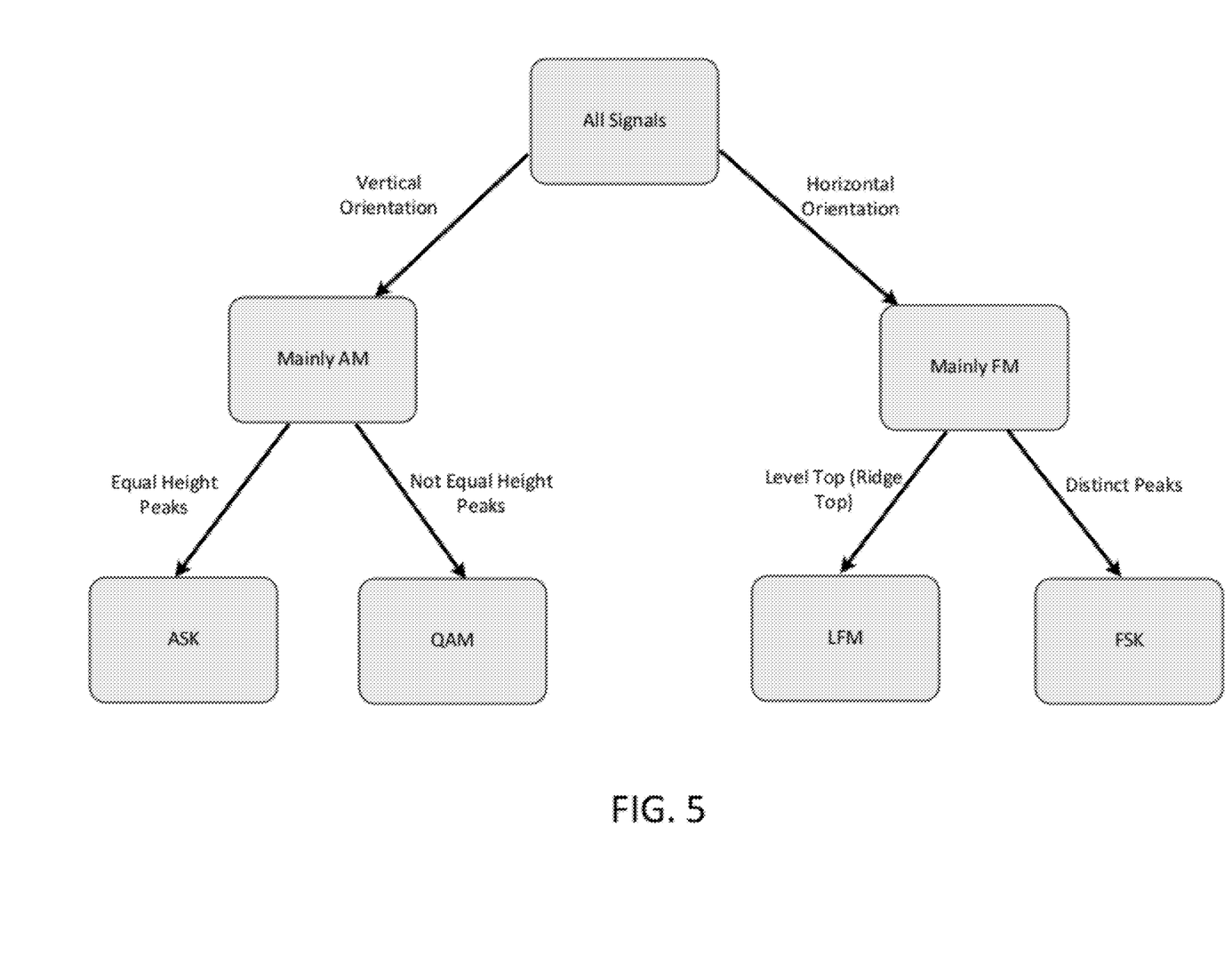
FIG. 5 is an example of a decision tree.

DTC can include determining a signal of interest in the PFM histogram 125 through a series of binary determinations. In some implementations, a DTC can include splitting the candidates into equally probable outcomes at each level such that half of the candidates are eliminated at each level, as in a binary search. For example, if there are thirty-two potential candidates in a database of expected signals, the outcome can be determined within five levels of hypotheses using binary decision criteria such that the hypotheses are split into substantially equally probable outcomes at each level. For example, at the top level, the potential types of signals can be divided into two classes based on whether the signals (or modulation types) appear as horizontally oriented (frequency) or vertically oriented (magnitude) in a two dimensional image representing the PFM histogram 125. In some implementations, the analysis module 130 can be configured to use a score to distinguish between these classes. An example of a decision tree diagram used in a DTC algorithm employed by the analysis module 130 is shown in FIG. 5.

In some implementations, the outcomes for a given level of the DTC algorithm can have unequal probabilities. In such cases, the analysis module 130 can be configured to be adapted to account for the unequally probable outcomes. In some implementations, the decision levels can also be adaptively changed.

In some implementations, where the PFM histogram 125 is represented as an image, the DTC algorithm employed by the analysis module 130 can be based on statistical moment features of uniquely identifiable groups of pixels. A component signal that can be isolated from the PFM histogram 125 is usually represented as a group of pixels (cluster) in the image. If multiple signals are present in a spectrum or bandwidth of interest, a particular signal can be isolated or identified in the image if the representation of the signal in the image is at least partially non-overlapping with representations of the other signals.

In some implementations, the analysis module 130 can be configured to use a cluster table to isolate, identify, or classify the component signals represented in the PFM histogram 125. An example algorithm that can be used to create the cluster table is described next. Other algorithms can also be used.

In the example algorithm, a PFM histogram image is parsed (for example, starting at the upper left corner of the image) until a pixel above a predetermined threshold pixel value (denoted A) is identified. A matrix can be defined and filled with nonzero values only at the index of the identified pixels. The matrix can be eventually populated with data from all the identified pixels in the image.

Once the pixels are identified, a second algorithm can parse the cells surrounding a given pixel to associate other pixels above the threshold A in one cluster. In some implementations, during the second parsing, other features associated with the pixels and/or clusters can be populated into tables that are used by the DTC algorithm. The features can include, for example, statistical features such as a peak height represented by the pixel, estimates for vertical and horizontal kurtosis of the peaks, the number of peaks within an identified cluster, cluster mass (sum of all cell heights within a cluster), mean and standard deviation of all peaks in a cluster, mean and standard deviation of all cells in a cluster, and horizontal and vertical mean and standard deviation of the indices of all the peaks within a cluster (i.e. vertical and horizontal location statistics). The term "peak" as used in this paragraph and the next, refers to bins of the PFM histogram for which the histogram height is higher than neighboring bins.

In some implementations, the cluster table can be modified to account for false peaks. False peaks can include, for example, peaks which are very close to actual peaks with nearly equivalent values, or have very minor inflections in flatter portions of the clusters as determined by the kurtosis estimates of the peak. These false peaks can be determined using an additional variable threshold which can be determined based on test data. The statistics for the remaining "true" peaks are accumulated separately without elimination of all peak data. In some implementations, the DTC algorithm used by the analysis module 130 can include peak statistics as well as the "true" peak statistics.

EXAMPLES

The following examples illustrate executed simulation results.

Generation of PFM Histogram Images

Simulations were performed to present the image patterns for different types of signals used in communications and radar signal processing. The following types of signals were used for the simulation: 1) two level Frequency Shift Keyed (FSK) signal, 2) two level Amplitude Shift Keyed (ASK) signal, 3) analog linear FM (LFM) signal, 4) 16 point Quadrature Amplitude Modulated (QAM16) signal. 5) Offset Quadrature Phase Shift Keyed (OQPSK) signal, and 6) An OFDM-like (Orthogonal Frequency Division Multiplexed) signal. Each of the baseband modulated data signals were formed from a set of random numbers, such as 1s and −1s for binary modulation, or $\{1, -\frac{1}{3}, \frac{1}{3}, 1\}$ for QAM16. The LFM signal was generated from a linear ramp signal. Each baseband signal is denoted by $A_{bb}$, which was generated from an oversampled series of these values that were passed through low pass filters to shape the signal for realistic bandwidth limiting. The signal construction was performed as follows.

A two level frequency shift keying (FSK) baseband signal was produced as:

$$S_1 = e^{j(2\pi T_s f_d \phi F)} \quad (14)$$

where $T_s$ is the sampling period, $f_d$ is the frequency deviation constant, and $$\phi_{F_j} = A_{bb_j} + \phi_{F_{j-1}} \, j=1,2,3,\ldots \infty \quad (15)$$

is the accumulated phase of the baseband FSK that is derived from the pulse shaped data signal $A_{bb}$ described above.

A two level amplitude shift keying (ASK) baseband signal was produced as:

$$S_2 = \left(A_{bb} + \frac{2}{g} - 1\right)\frac{2}{g} \quad (16)$$

where g is the modulation depth with value 0 to 1.

A linear FM (LFM) baseband signal was produced as:

$$S_3 = e^{j(2\pi T_s f_d \phi LFM)} \quad (17)$$

where $T_s$ is the sampling period, $f_d$ is the LFM base frequency constant, and, is the phase accumulation for the LFM signal.

A 16 point quadrature amplitude modulation (QAM) signal was produced as:

$$S_4 = mI + jmQ \quad (18)$$

where mI and mQ are both four-level uniformly distributed random variables from the set $\{-1, -\frac{1}{3}, \frac{1}{3}, 1\}$. The values were upsampled and filtered just as in the case of the binary baseband signals.

An offset quadrature phase shift keying (OQPSK) signal was produced as:

$$S_5 = mI + jmQ \quad (19)$$

where mI and mQ are both two-level uniformly distributed random variables from the set $\{-1, 1\}$. The values were upsampled and filtered. The delay of the upsampled mI signal was shifted to ½ the symbol period to produce the offset characteristic of the signal. This reduced the amplitude fluctuation that occurs as a result of the bandwidth limiting.

An orthogonal frequency division multiplexing (OFDM)-like signal was produced as:

$$S_6 = Vec\{IFFT_k\{S_{p,k}\}\} \quad (20)$$

where $$S_{p,k} = mI + jmQ\|\overline{0} \quad (21)$$

is a 16 point QAM signal (with no upsampling or filtering) taken in k blocks of N size and padded with zeros to the length of the IFFT. As in the case of 16QAM, the values for mI and mQ were taken from the set $\{-1, -\frac{1}{3}, \frac{1}{3}, 1\}$. The Vec$\{\ \}$ function created a single vector from the concatenation of the k sequences generated from each IFFT function.

The received signal for the simulation was a superposition of sub-signals as follows:

$$x(n) = N(n) + \sum_{m=1}^{6} S_m(n) A_m e^{j(2\pi n f c_m + \varphi_m)} \quad (22)$$

where N(n) is the AWGN that is added to the composite signal. $A_m$ is an amplitude factor that is applied independently to each signal to provide variance to the signal levels, and $f_{cm}$ is the carrier frequency of each independent signal. The carrier frequencies were set to avoid spectrum overlap between signals. $S_m$ are the individual test signals described above.

After the PFM histograms were generated for the signals in the simulated bandwidth, a 5 by 5 pixel smoothing filter was applied to help create an image that facilitated normalized viewing of the individual signals. The selection and performance of the smoothing was subjective in the case of manual identification of the signals. For the resulting PFM histogram images shown in FIGS. 6A-6D, a simple pyramid shape was used as the filter kernel.

Figure 6A:
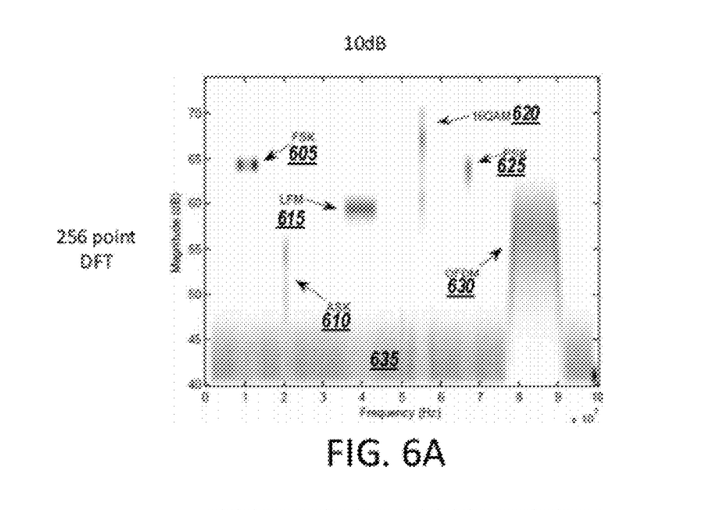
FIGS. 6A-6E are example representations of PFM histograms.
Figure 6B:
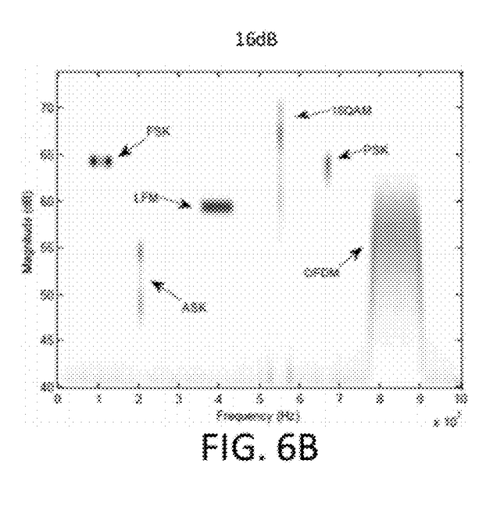
Figure 6C:
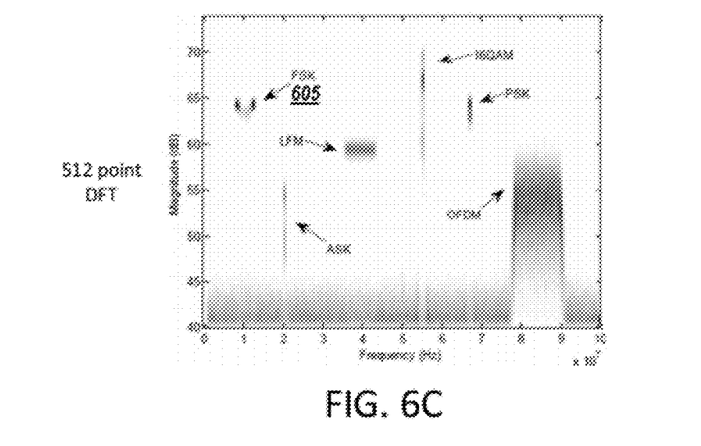
Figure 6D:
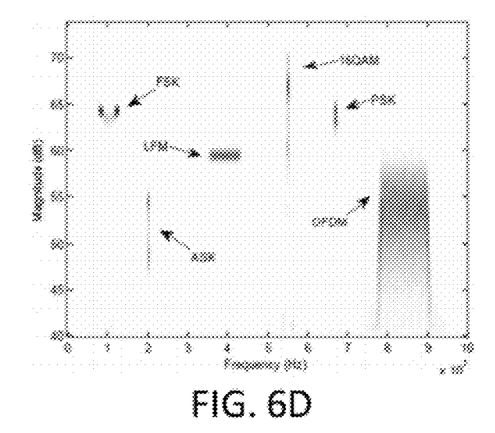

FIG. 6A-6D show images representing PFM histograms generated using different parameters. FIGS. 6A and 6B represent PFM histogram images generated using a 256 point DFT under 10 dB and 16 dB signal to noise ratio (SNR), respectively. FIGS. 6C and 6D represent PFM histogram images generated using a 512 point DFT under 10 dB and 16 dB SNR, respectively. FIG. 6A shows the distinct patterns of the example signals used in the simulation. The two level FSK signal produces a dual hump pattern 605 along the horizontal (frequency) axis, and the two level ASK signal produces a dual hump pattern 610 in the vertical (magnitude) axis. The dual humps in these patterns are not independent humps. The humps from the modulated signals form connected clusters due to the band limited nature of the modulated signals. The signals do not change from one state to another instantaneously in a practical system, and the PFM histogram image shows this feature by displaying connected, albeit lower, "ridges" between the humps. These distinctive characteristics allow isolation and classification of the signals.

FIG. 6A also shows that the LFM is represented as a solid line 615 across the horizontal axis. The 16-QAM, PSK and OFDM-like signals correspond to the representations, 620, 625, and 630, respectively.

FIG. 6B shows the PFM histogram image of the same composite input signal where the SNR is increased to 16 dB. Comparing FIGS. 6A and 6B, it is seen that a reduced SNR (as in FIG. 6A) results in a smearing effect on the signal clusters and a cloud of noise 635 appears at the bottom of the image.

Figure 6E:
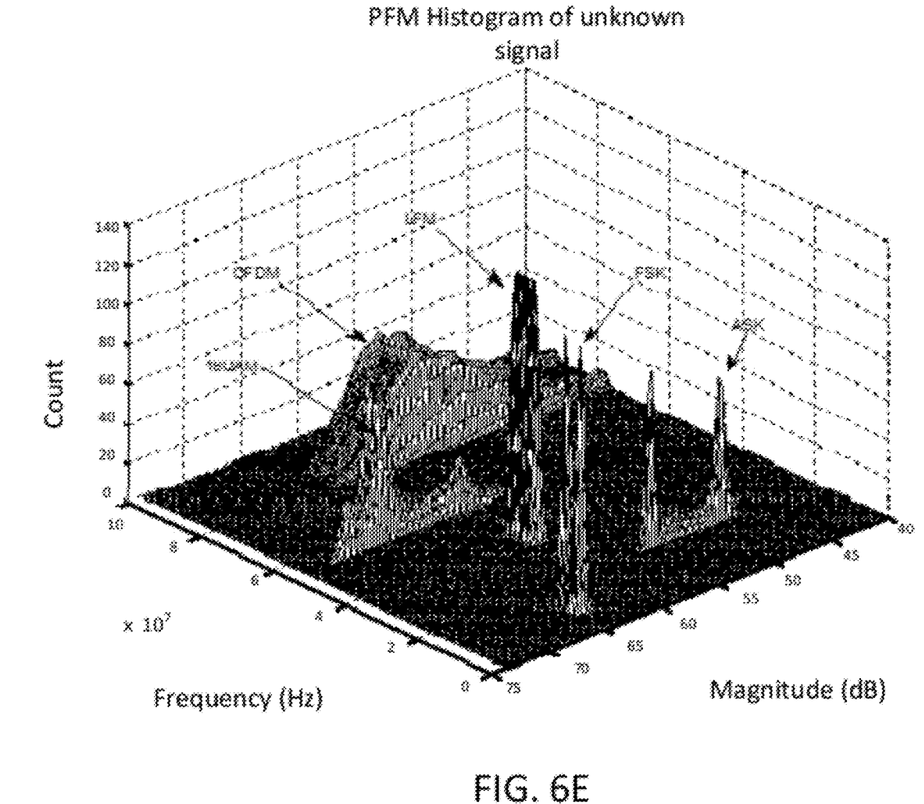

FIGS. 6C and 6D show PFM histogram images corresponding to the same composite signal produced using 512 point DFTs. The SNR for FIG. 6C was kept at 10 dB and the SNR for FIG. 6D was 16 dB. An effect of the increased DFT size is observed in, for example, the feature of the hump connection in the representation 605 of the two level FSK signal. In FIG. 6C, the connection is somewhat offset in magnitude from the two humps, forming an arched ridge instead of a straight line. This indicates that the transition between FSK levels incurs some reduction in the DFT power for those bins which can be seen at higher frequency resolutions. FIG. 6E illustrates a three dimensional representation of the PFM histogram.

Automated Classification

Figure 7A:
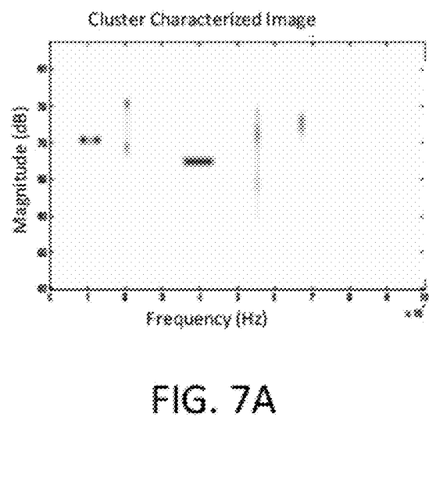
FIGS. 7A-7C are examples of PFM histogram images as used in an automatic classifier.

Simulations were also performed to measure the performance of the automated analysis of PFM histogram images (referred to herein as "automated signal classification" (ASC)) described above. Five of the six signals from PFM histogram simulations were used in this simulation. The OFDM like signal was excluded from the simulations for classification performance. The simulation included 50 trials of randomized data for each of several SNR values. The signal power from each signal was adjusted from the original PFM histogram images in order to normalize the power of each with respect to the others so that a change in noise power resulted in all signals having nearly the same average SNR with each run. Some of the main parameters used for the ASC simulations were as follows: DFT size of 256, block size of 100, sample rate of 100 MHz, emulated dwell time of approximately 20 mS. The range of SNR over the simulation was about 50 dB (41 to −8). An example PFM histogram for the images used in the ASC simulations is shown in FIG. 7A.

The database of potential candidates was larger than the number of signal used in the simulation, so that as the DTC algorithm parsed through the features, if none of the features passed given tests, an alternate unknown signal type was assumed. Therefore, the database of candidates for the simulations contained 7 different signal types (ASK, FSK, LFM, QAM16, PSK, Alternate AM, Alternate FM). A curve was generated showing the rate of successful signal classification for each simulated signal relative to SNR.

After the ASC performed a first round of processing on the PFM Histogram image and characterized the clusters, a new quantized image was developed showing the decision boundaries and identified pixels for each cluster. This quantized image is illustrated in FIG. 7B.

Figure 7B:
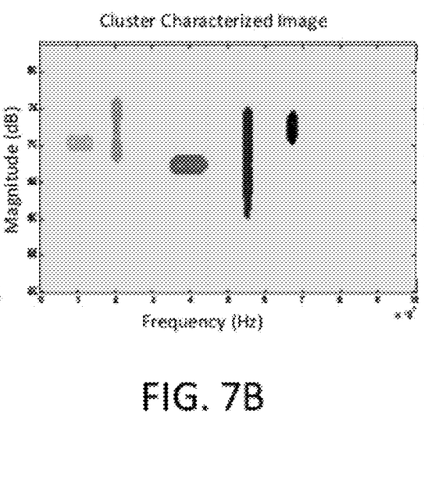
Figure 7C:
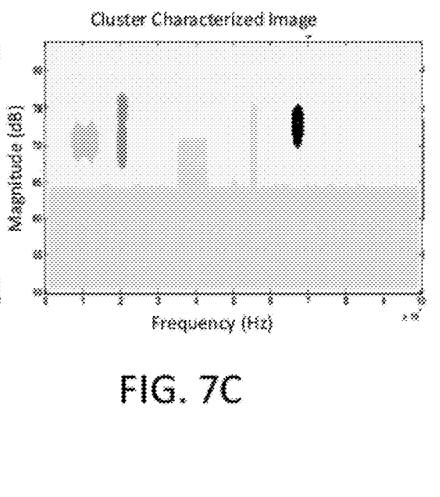

Each cluster in FIG. 7B is given a different shade of grey to denote independence. Localized peaks are shown as small off color dots within the clusters. As the SNR decreases, the noise creates separate clusters at first but eventually begins to merge with other lower clusters. This is illustrated in FIG. 7C.

Figure 8:
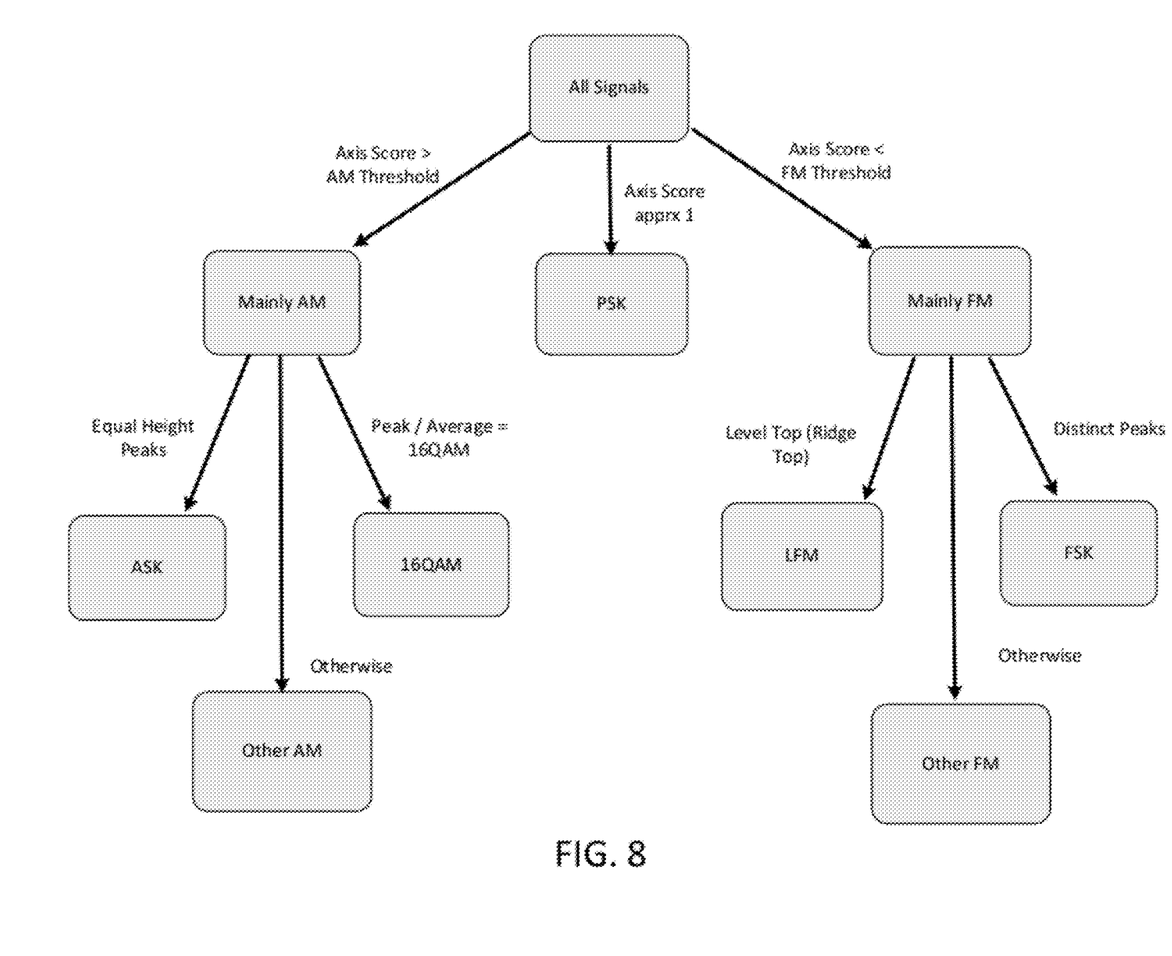
FIG. 8 is an example of a decision tree used in an automatic classification process.
Figure 9:
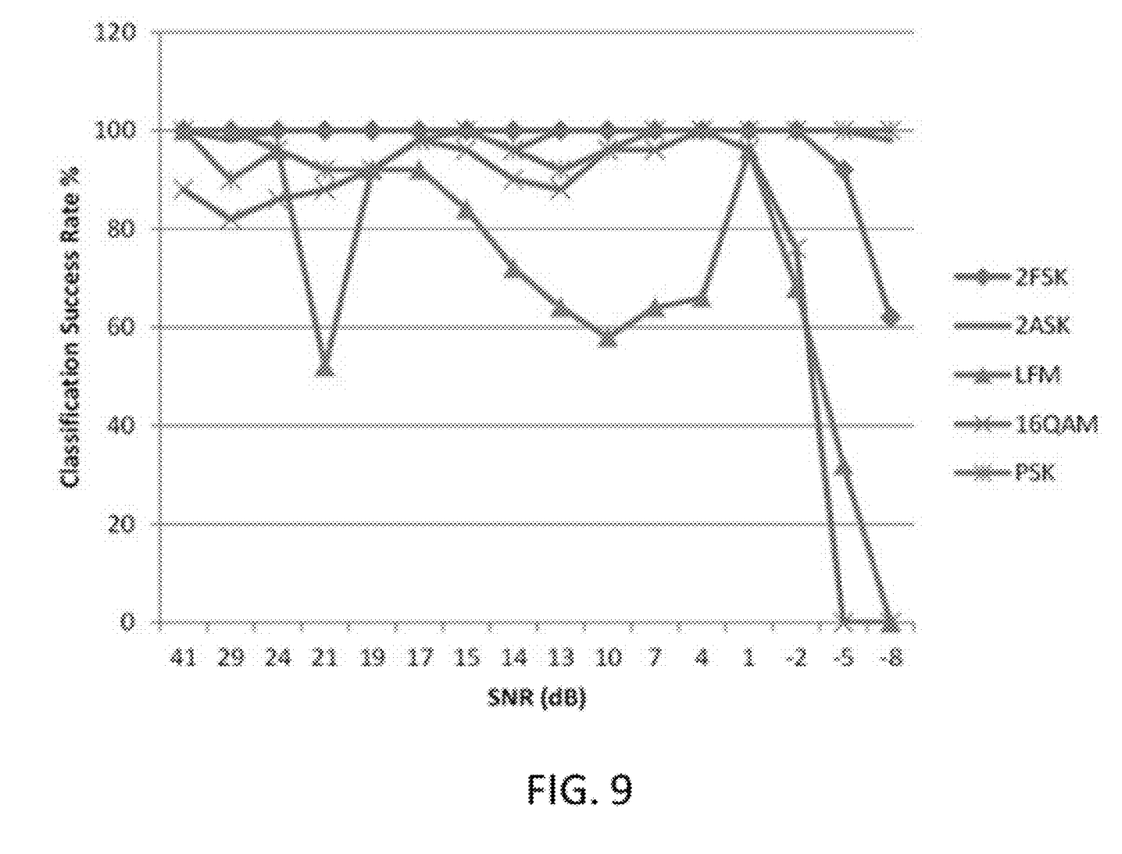
FIG. 9 is a diagram illustrating classification performance of an automatic classifier.

A decision similar to that used in the simulation is illustrated in FIG. 8. Each branch of the tree requires some thresholds to make the branch decision. These thresholds were maintained constant throughout the simulation. However, in some implementations, these thresholds can be made adaptive. A summary of the performance over the range of SNR is shown in FIG. 9.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   partitioning a received signal into a sequence of two or more segments;

for a given segment in the sequence,
calculating a set of frequency domain coefficients corresponding to the given segment, and
identifying local peaks in the set of frequency domain coefficients by applying a threshold to the magnitudes of the frequency domain coefficients, such that peak magnitude of each identified local peak exceeds the threshold; and
producing, using a processor, a multi-dimensional histogram from the peaks identified from multiple segments, wherein the multi-dimensional histogram comprises a plurality of bins, each bin in the multi-dimensional histogram is a function of frequency and peak magnitude, and content of each bin in the multi-dimensional histogram reflects a count of identified peaks represented by the corresponding frequency and magnitude.

2. The method of claim 1, wherein the multi-dimensional histogram is represented as an image.

3. The method of claim 2, further comprising identifying, from the multi-dimensional histogram, a modulation characteristic of a signal.

4. The method of claim 3, wherein the modulation characteristic includes a modulation type.

5. The method of claim 4, wherein the modulation type is selected from a group consisting of: amplitude shift keying (ASK), phase shift keying (PSK), frequency shift keying (FSK), frequency modulation (FM), quadrature amplitude modulation (QAM), offset quadrature phase shift keying (OQPSK), and orthogonal frequency divisional multiplexing (OFDM).

6. The method of claim 3, wherein the identifying is performed using an automatic classifier.

7. The method of claim 1, wherein identifying the local peaks comprises identifying one or more coefficients that exceed the threshold and selecting a coefficient that corresponds to an inflection point.

8. The method of claim 1, wherein calculating the frequency domain coefficients comprises:
obtaining a windowed segment as a product of the given segment and a window function; and
calculating the frequency domain coefficients using the windowed segment.

9. The method of claim 1, wherein producing the multi-dimensional histogram further comprises:
providing a quantized value based on a magnitude of an identified peak.

10. The method of claim 9, further comprising:
binning the quantized value into one of a plurality of magnitude bins defined for a frequency corresponding to the identified peak.

11. The method of claim 1, further comprising determining a decoding method for a software defined radio (SDR) application based on the multi-dimensional histogram.

12. The method of claim 1, wherein calculating the frequency domain coefficients comprises computing a short time discrete Fourier transform.

13. A system comprising:
a computing device comprising a processor and memory, the computing device configured to:
partition a received signal into a sequence of two or more segments;
for a given segment in the sequence,
calculate a set of frequency domain coefficients corresponding to the given segment, and
identify local peaks in the set of frequency domain coefficients by applying a threshold to the magnitudes of the frequency domain coefficients, such that peak magnitude of each identified local peak exceeds the threshold; and
produce a multi-dimensional histogram from the peaks identified from multiple segments, wherein the multi-dimensional histogram comprises a plurality of bins, each bin in the multi-dimensional histogram is a function of frequency and peak magnitude, and content of each bin in the multi-dimensional histogram reflects a count of identified peaks represented by the corresponding frequency and magnitude.

14. The system of claim 13, further comprising an analysis module configured to automatically identify one or more component signals by analyzing the multi-dimensional histogram.

15. The system of claim 13, wherein the computing device produces the multi-dimensional histogram by:
providing a quantized value based on a magnitude of an identified peak.

16. The system of claim 15, further configured to:
bin the quantized value into one of a plurality of magnitude bins defined for a frequency corresponding to the identified peak.

17. A computer program product comprising computer readable instructions tangibly embodied in a non-transitory computer-readable medium, the instructions configured to cause one or more processors to:
partition a received signal into a sequence of two or more segments;
for a given segment in the sequence,
calculate a set of frequency domain coefficients corresponding to the given segment, and
identify local peaks in the set of frequency domain coefficients by applying a threshold to the magnitudes of the frequency domain coefficients, such that peak magnitude of each identified local peak exceeds the threshold; and
produce a multi-dimensional histogram from the peaks identified from multiple segments, wherein the multi-dimensional histogram comprises a plurality of bins, each bin in the multi-dimensional histogram is a function of frequency and peak magnitude, and content of each bin in the multi-dimensional histogram reflects a count of identified peaks represented by the corresponding frequency and magnitude.

18. The computer program product of claim 17, wherein the instructions further cause a processor to automatically identify one or more component signals by analyzing the multi-dimensional histogram.

19. The computer program product of claim 17, wherein the instructions further cause a processor to produce the multi-dimensional histogram by:
providing a quantized value based on a magnitude of an identified peak.

20. The computer program product of claim 19, wherein the instructions further cause a processor to:
bin the quantized value into one of a plurality of magnitude bins defined for a frequency corresponding to the identified peak.

* * * * *